(12) United States Patent
Stokkeland et al.

(10) Patent No.: US 8,347,805 B2
(45) Date of Patent: Jan. 8, 2013

(54) SYSTEM AND METHOD OF CONTROLLING FORCE DEVELOPED BY A PARAVANE SYSTEM

(75) Inventors: Jan Erik Stokkeland, Heggedal (NO); Anders G Mattsson, Lysaker (NO); Martin Austad, Olso (NO)

(73) Assignee: PGS Geophysical AS, Lysaker (NO)

( * ) Notice: Subject to any disclaimer, the term of this patent is extended or adjusted under 35 U.S.C. 154(b) by 164 days.

(21) Appl. No.: 13/040,706

(22) Filed: Mar. 4, 2011

(65) Prior Publication Data

US 2012/0222607 A1 Sep. 6, 2012

(51) Int. Cl.
*B63B 21/04* (2006.01)
(52) U.S. Cl. .................................. 114/253; 114/244
(58) Field of Classification Search .................. 114/253, 114/244
See application file for complete search history.

(56) References Cited

U.S. PATENT DOCUMENTS

| | | | |
|---|---|---|---|
| 4,574,723 A | 3/1986 | Chiles | |
| 4,890,568 A | 1/1990 | Dolengowski | |
| 5,050,459 A | 9/1991 | Ishikawa | |
| 6,504,792 B2 | 1/2003 | Barker | |
| 6,877,453 B2 | 4/2005 | Hocquet | |
| 7,156,035 B2 | 1/2007 | Hocquet | |
| 7,404,370 B2 | 7/2008 | Stokkeland | |
| 7,425,186 B2 | 9/2008 | Lemberger | |
| 7,469,652 B2 | 12/2008 | Kristiansen | |
| 7,658,161 B2 * | 2/2010 | Toennessen et al. | 114/246 |
| 7,660,190 B2 | 2/2010 | Keskes | |
| 7,881,153 B2 | 2/2011 | Stokkeland | |
| 2009/0245019 A1 | 10/2009 | Falkenberg | |
| 2010/0149910 A1 * | 6/2010 | Martin | 367/17 |
| 2012/0067265 A1 * | 3/2012 | Val | 114/253 |

FOREIGN PATENT DOCUMENTS

| | | |
|---|---|---|
| EP | 0168959 A1 | 1/1986 |
| GB | 2122562 A | 1/1984 |
| GB | 2399883 A | 9/2004 |
| GB | 2424217 A | 9/2006 |
| GB | 2440636 A | 5/2008 |

OTHER PUBLICATIONS

United Kingdom Search Report for Application No. GB1202738.9, dated: Mar. 26, 2012.

* cited by examiner

*Primary Examiner* — Stephen Avila (57) ABSTRACT

Controlling lateral force developed by a paravane system. At least some of the illustrative embodiments are methods including: towing a paravane system through water, the towing by way of a bridle comprising a plurality of fixed-length forward lines coupled to a respective plurality of forward tow points, and a plurality of fixed-length aft lines coupled to a respective plurality of aft tow points; and while towing the paravane system through the water changing one or both of the lateral force supplied by the paravane or the direction of the force supplied by the paravane.

22 Claims, 9 Drawing Sheets

SYSTEM AND METHOD OF CONTROLLING FORCE DEVELOPED BY A PARAVANE SYSTEM

BACKGROUND

Marine survey systems are used to acquire data, for example seismic or electromagnetic, regarding Earth formations below a body of water such as a lake or ocean. The marine survey systems comprise a complex array of buoys, lines, and paravane systems in order to properly orient streamers towed behind the survey vessel. In some cases, changes to operation of various towed components (e.g., change in lateral force supplied by one of the paravane systems) during operation would be beneficial, but such changes are difficult to implement in practice.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, load carrying member that also comprises electrical conducts and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Substantially" shall mean, with respect to distance measures, a change of five percent (5%) or less of the distance.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments are directed to controllable paravane systems. In some embodiments, the amount of force created by a paravane, and in some cases the direction of the force, may be controlled during operation. In a particular embodiment, the location of the lines coupled to the paravane, and/or the distance between the couplings of the lines to the paravane, may be adjusted to control the force developed and/or the direction of the force by the paravane. The specification first turns to an illustrative marine survey system, and then discusses paravanes in accordance with various embodiments.

Figure 1:
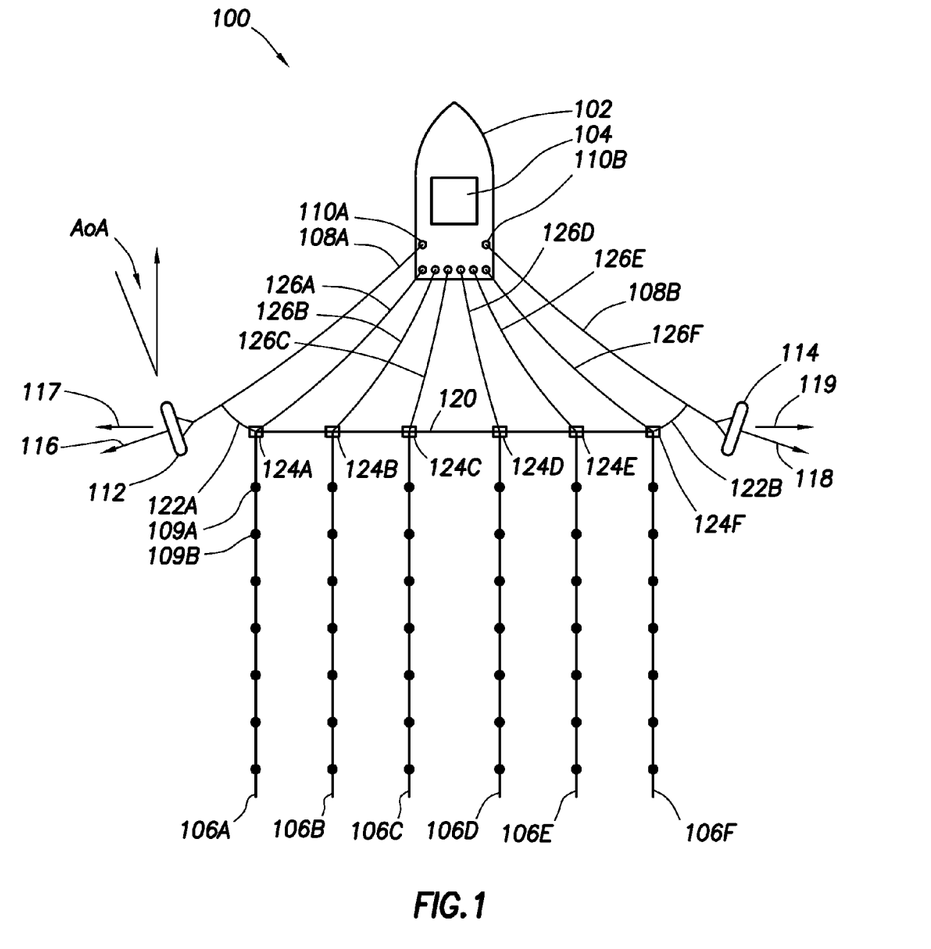
FIG. 1 shows an overhead view of marine survey system in accordance with at least some embodiments.

FIG. 1 shows an overhead view of a marine survey system 100 in accordance with at least some embodiments. In particular, FIG. 1 shows a survey vessel 102 having onboard equipment 104, such as navigation, energy source control, and data recording equipment. Survey vessel 102 is configured to tow one or more sensor streamers 106A-F through the water. While FIG. 1 illustratively shows six streamers 106, any number of streamers 106 may be equivalently used.

The streamers 106 are coupled to towing equipment that maintains the streamers 106 at selected lateral positions with respect to each other and with respect to the survey vessel 102. The towing equipment may comprise two paravane tow lines 108A and 108B each coupled to the vessel 102 by way of winches 110A and 110B, respectively. The winches enable changing the deployed length of each paravane tow lines 108. The second end paravane tow line 108A is coupled to a paravane 112, and the second end of paravane tow line 108B is coupled to paravane 114. In each case, the tow lines 108A and 108B couple to their respective paravanes through respective sets of lines called a "bridle". The paravanes 112 and 114 are each configured to provide a lateral force component to the various elements of the survey system when the paravanes are towed in the water, as will be explained below. Lateral in this context means transverse to the direction of motion of the vessel 102. The lateral force component of paravane 112 is opposed to that of paravane 114. For example, paravane 112 may create a force as illustrated by arrow 116, and the lateral component of force 116 is shown by arrow 117. Likewise, paravane 114 may create a force as illustrated by arrow 118, and the lateral component of force 118 is shown by arrow 119. The combined lateral forces of the paravanes 112 and 114 separate the paravanes from each other until they put one or more spreader lines 120, coupled between the paravanes 112 and 114, into tension. The paravanes 112 and 114 either couple directly to the spreader line 120, or as illustrated couple to the spreader line by way of spur lines 122A and 122B.

The streamers 106 are each coupled, at the ends nearest the vessel 102 to a respective lead-in cable termination 124A-F. The lead-in cable terminations 124 are coupled to or are associated with the spreader lines 120 so as to control the lateral positions of the streamers 106 with respect to each other and with respect to the vessel 102. Electrical and/or optical connections between the appropriate components in the recording system 104 and the sensors (e.g., 109A, 109B) in the streamers 106 may be made using inner lead-in cables 126A-F. Much like the tow lines 108 associated with respective winches 110, each of the lead-in cables 126 may be deployed by a respective winch or similar spooling device such that the deployed length of each lead-in cable 126 can be changed.

During periods of time when the survey vessel 102 is traveling in an approximately straight line, the speed of the paravanes 112 and 114 through the water is approximately the same, and thus the lateral force created by similarly configured paravane 112 and 114 may be approximately the same. However, when the survey vessel 102 executes a turn (e.g., a 180 degree turn to align the vessel for the next pass over the survey area), the paravane on the outside of the turn tends to move faster through the water than the paravane on the inside of the turn. Consider, as an example, that the survey vessel 102 makes a turn to the left. In the example situation, paravane 112 tends to move slower through the water during the turn than paravane 114. Since the lateral force exerted by a paravane is based on speed of the paravane with respect to the water, paravane 114 in this example develops greater lateral force than paravane 112. In some cases, the force generated by the faster moving paravane can be excessive. As a consequence, often the speed of the vessel is limited during turns, thus reducing the efficiency with which a survey can be performed.

Water currents also create problems. Again, paravanes create the lateral force based on the relative speed between the paravane and the water (as opposed to the absolute speed of the paravane). Thus, water currents affect the lateral force created. Water currents moving opposite the direction of motion of the survey vessel 102 cause the amount of force created by the paravanes to increase due to increased water velocity past the paravane. Water currents moving in the same direction as the survey vessel 102 decrease the amount of force created by the paravane due to decreased water velocity past the paravane. Water currents moving transversely to the direction of motion of the survey vessel 102 may move the paravanes, and thereby the streamer array, laterally in a manner that is difficult for the system operator to compensate for or control.

In the various embodiments, the paravanes 112 and 114 have adjustable lateral force, such that the tension on the spreader lines 120 can be controlled. The paravanes 112 and 114 according at least some embodiments comprise systems to controllably redirect the flow of water past the paravane, and/or adjust the angle of attack to control the amount of lateral force developed. Angle of attack for purposes of this disclosure and claims shall be a relationship between the direction of motion of the tow vessel 102 and a long dimension of one or more frames (described below) of the paravane. FIG. 1 shows the angle of attack (AoA) for the illustrative situation of FIG. 1. Such control may be helpful in a variety of situations, such as during turns and to compensate for water currents.

Figure 2:
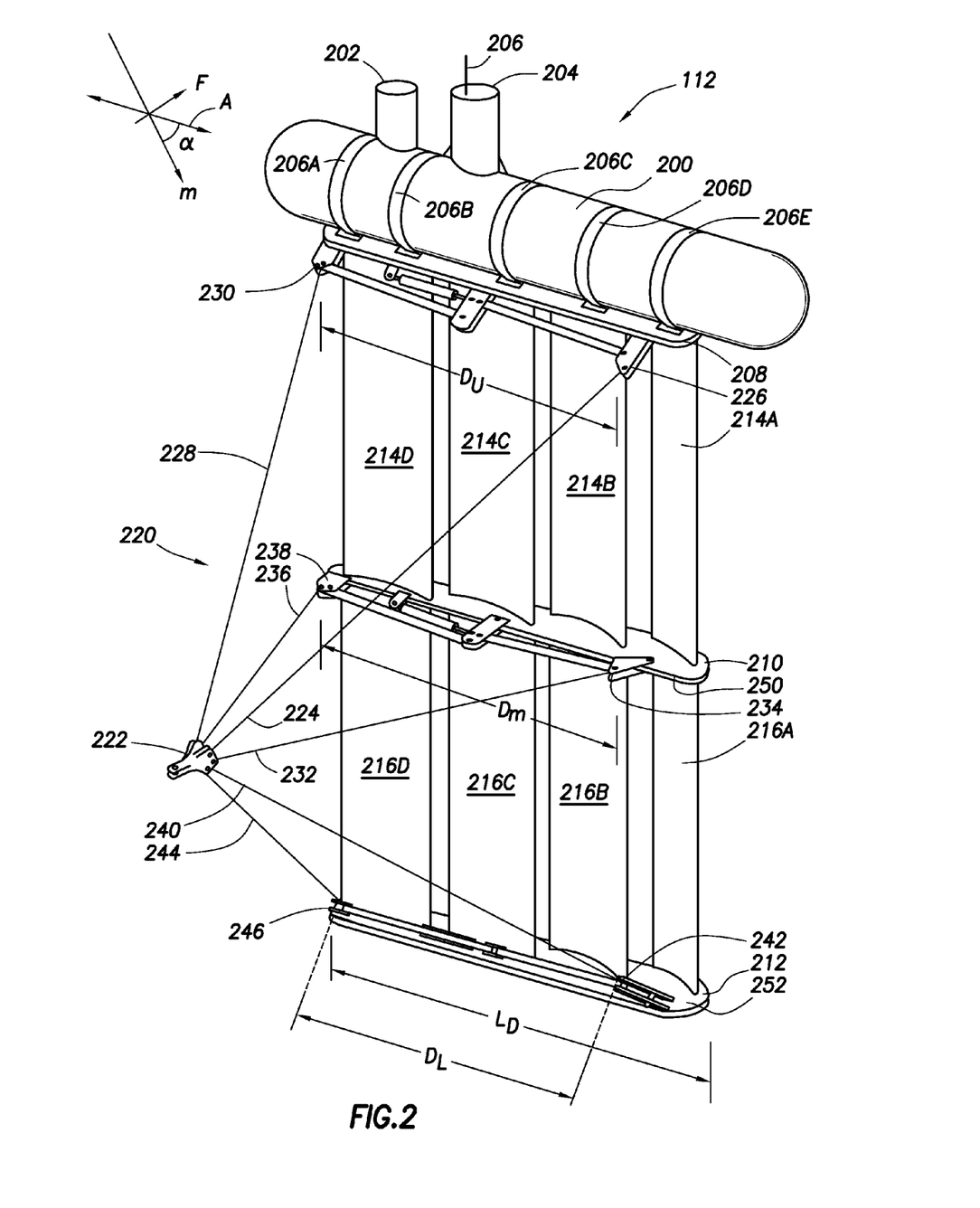
FIG. 2 shows a perspective view of a paravane and bridle in accordance with at least some embodiments.

FIG. 2 shows a paravane 112 in accordance with at least some embodiments. It is noted that paravane 114 is, in some embodiments (and from a mechanical standpoint), a mirror image of paravane 112; thus, the specification discusses only paravane 112 with the understanding the discussion is equally applicable to paravane 114 taking into account the mirror symmetry. Paravane 112 comprises a buoy or float 200, which float 200 provides a buoyant force for the paravane during operation, and also fixes the vertical orientation of the paravane 112 in the water. While in some cases the float 200 may reside at or near the surface of the water or may be partially submerged, in other embodiments the float may be fully submerged during operation. The amount of buoyant force provided by the float 200 may be adjustable (such as by filling ballast tanks). The float 200 may comprise one or more towers, such as towers 202 and 204. The towers 202 and 204, if present, may provide a housing for one more control and/or communication systems, such as a control system to control location of the tow points and/or the bridle geometry (discussed more below), and/or a communication system over which to communicate with the vessels engaged in the marine survey (as illustrated by antenna 206). Illustrative float 200 couples to the balance of the paravane 112 by way of a plurality of straps 206A-E; however, other numbers of straps, and other attachment mechanisms, may be equivalently used.

The paravane 112 further comprises an upper frame 208, to which the straps 206 are coupled. The illustrative paravane 112 also comprises a middle frame 210 and lower frame 212. Each frame defines a long dimension, with the long dimension indicated as $L_D$ in the figure. Coupled between upper frame 208 and the middle frame 210 are a plurality of diverter plates 214A-D. Greater or fewer diverter plates may be equivalently used. The diverter plates 214 are designed in such a way as to re-direct water flow through the plates such that a lateral force is developed. The diversion of water by the diverter plates 214 to create the force may be based on an angle of otherwise flat diverter plates to the direction of water flow, the diverter plates 214 having a curvature as illustrated, by some or all the plates having an airfoil-type cross-section, or some combination.

The illustrative paravane 112 further comprises a plurality of diverter plates 216A-D coupled between middle frame 210 and the lower frame 212. Greater or fewer diverter plates may be equivalently used. Diverter plates 216 are also designed in such a way as to re-direct water flow through the plates such that a lateral force is developed. In some cases, the diverter plates 214 are separate mechanical elements from diverter plates 216, and in other cases each diverter plate is a single element that extends through middle frame 210 (e.g., diverter plate 214A and 216A may be a single unit extending through the middle frame 210).

It is noted that paravane 112, having three frames and two sets of diverter plates extending between the frames, is merely illustrative. The various embodiments may be equivalently implemented on paravanes having only a single set of diverter plates extending between two frames (e.g., just diverter plates 214), as well as paravanes having three or more sets of diverter plates (e.g., diverter plates 214, 216, and other sets below diverter plates 216).

Before proceeding, it is noted that paravane 112 moves through the water at an angle relative to the direction of travel. Consider an axis A of the float 200. The motion of the paravane 112 through the water indicated by arrow M forms an acute angle α with the axis A. The precise angle depends on a variety of factors, such as speed of the paravane 112 relative to the water, bridle geometry, and the amount of resistance to movement the paravane 112 presents. The force created is substantially perpendicular to the illustrative axis A, and also substantially normal to a plane defined by the paravane diverter plates, with the approximate direction indicated by arrow F. In spite of the fact that the paravane direction of movement forms an acute angle with the respect to the illustrative axis A, and further in spite of the fact the paravane may "tilt" as the paravane is pulled through the water, the leading vertical geometry (e.g., diverter plate 214A, 216A) shall still be considered "forward" for purposes of this specification and claims. Though discussed in reference to the illustrative axis A, the discussion is equally applicable to, for example, the long dimension $L_D$ of any frame.

The paravane 112 may be coupled to the tow line 108A and the spreader line 120 by way of a bridle assembly 220. In particular, the bridle assembly 220 comprises bridle tow point 222, to which the tow line 108, spreader line 120, and/or spur line 124A may couple. Between the bridle tow point 222 and the frames reside a plurality of lines. In particular, an upper-forward line 224 couples between the bridle tow point 222 and the forward tow point 226 coupled to the upper frame 208. An upper-aft line 228 couples between the bridle tow point 222 and aft tow point 230 coupled to the upper frame 208. A middle-forward line 232 couples between the bridle tow point 222 and the forward tow point 234 coupled to the middle frame 210. A middle-aft line 236 couples between the bridle tow point 222 and aft tow point 238 coupled to the middle frame 210. A lower-forward line 240 couples between the bridle tow point 222 and the forward tow point 242 coupled to the lower frame 212. And a lower-aft line 244 couples between the bridle tow point 222 and aft tow point 246 coupled to the lower frame 212.

In accordance with the illustrated embodiment, the amount of force developed by the paravane 112 is controllable during use (i.e., as the paravane is towed through the water) by selective control of the location of the tow points relative to the frames. For example: the location of the forward tow point 226 and the corresponding aft tow point 230 relative to the upper frame 208 may be changed (while the distance between the tow points remains unchanged); the location of the location of the forward tow point 234 and the corresponding aft tow point 238 relative to the middle frame 210 may be changed (while the distance between the tow points remains substantially unchanged); and/or the distance between the forward tow point 242 and the corresponding aft tow point 246 relative to the lower frame 212 may be changed (while the distance between the tow points remains substantially unchanged).

Figure 3:
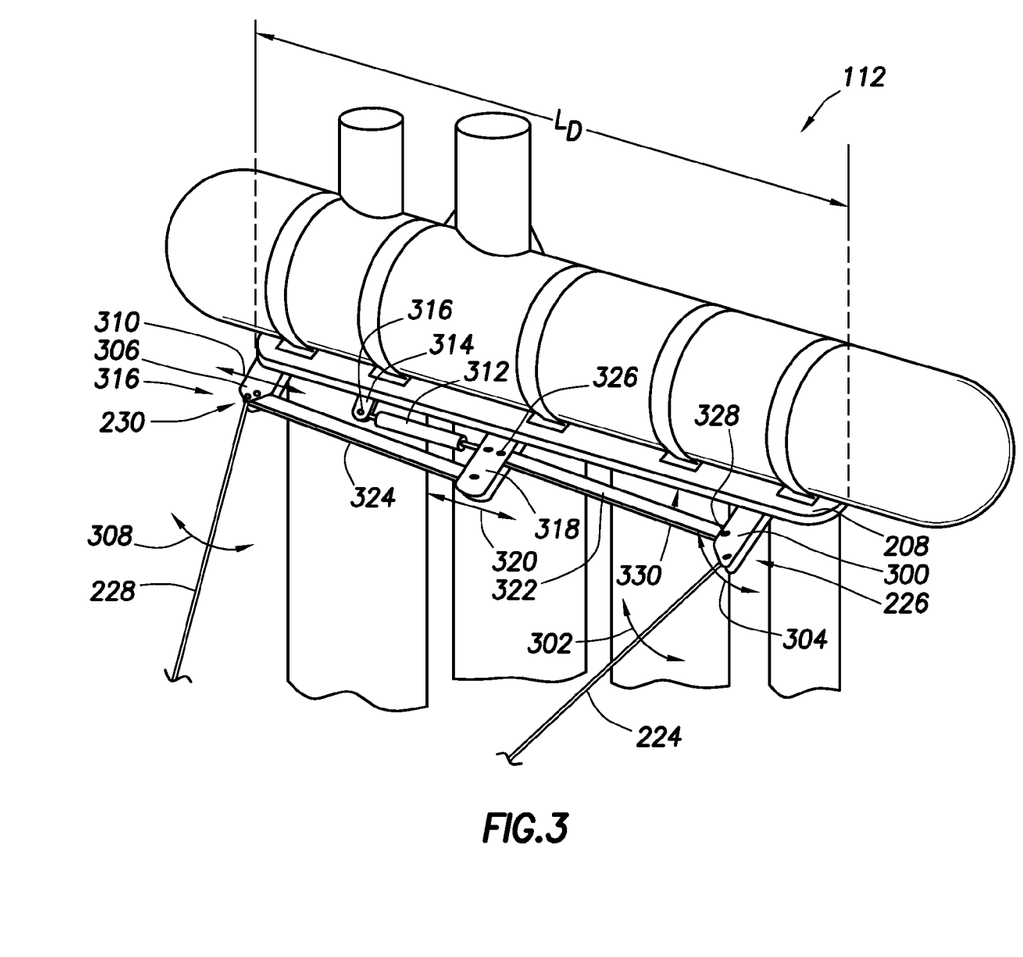
FIG. 3 shows a partial perspective view of a paravane in accordance with at least some embodiments.

FIG. 3 shows a perspective view of an upper portion of the paravane 112 in order to discuss an illustrative system for controlling the location of the tow points with respect to the frame. FIG. 3 illustrates the upper frame and various components, with the understanding that except for minor differences, highlighted more below, the system to change the location of the tow points relative to each frame may be substantially the same. Thus, the discussion with respect to the systems associated with upper frame 208 is equally applicable to the systems associated with middle frame 210, lower frame 212, and any additional frames that may be implemented. In particular, the illustrated upper frame defines the forward tow point 226 disposed at a distal end of the frame 208. Forward tow point 226 may shift relative to the frame, and in the example embodiment the forward tow point 226 is defined on shackle 300. Upper-forward line 224 couples to the shackle 300 in such a way as to enable the line 224 to rotate within a plane defined by the shackle, the movement illustrated by arrow 302. Likewise, shackle 300 is coupled to the upper frame 208 in such a way that the shackle 300 itself rotates about an axis, the rotation of shackle 300 illustrated by arrow 304, thus enabling the location of the tow point 226 to shift relative to the long dimension of the upper frame 208 (long dimension labeled as $L_D$ in the figure). The coupling mechanism of the shackle 300 to the frame is not visible in FIG. 3, and will be discussed more below.

FIG. 3 also illustrates the aft tow point 230. Illustrative aft tow point 230 is defined on aft trolley 306 disposed on a distal end of the first frame 208 opposite forward tow point 226. Upper-aft line 228 couples to the aft trolley 306 in such a way as to enable the line 228 to rotate within a plane defined by the trolley, the movement illustrated by arrow 308. Aft trolley 306 is coupled to the upper frame 208 in such a way that the aft trolley 306 may change position relative to the long dimension $L_D$ of the upper frame 208. That is, the aft trolley 306 may be selectively positioned relative the upper frame 208, the selective positioning illustrated by arrow 310. The aft trolley 306 moves along any suitable system, such as a rail system (e.g., a monorail), also discussed more below.

FIG. 3 further shows a linear actuator 312. Linear actuator 312 couples to the frame by way of a link 314. Link 314 affixes a first end of the linear actuator 312 against movement along the long dimension $L_D$ of the upper frame 208, but in some embodiments may enable rotation about an axis defined by pin 316. In the illustrative embodiments of FIG. 3 the linear actuator couples to the shackle 300 by way of a medial trolley 318, the medial trolley disposed medially with respect to the upper frame 208. Medial trolley 318 is coupled to the upper frame 208 in such a way that the medial trolley may change position relative to the long dimension $L_D$ of the upper frame 208. That is, the medial trolley 318 may be selectively positioned relative to the upper frame 208, the selective positioning illustrated by arrow 320. The medial trolley 318 moves along any suitable system, such as a rail system. In some embodiments, the rail system used by the medial trolley 318 is the same rail system as used by the aft trolley 306. In other case, the rail systems used by the aft trolley 306 and the medial trolley 318 may be distinct from each other.

In the illustrative embodiments of FIG. 3, the medial trolley 318 is coupled to the shackle 300 by way of a rigid link 322, and is coupled to the aft trolley by way of a rigid link 324. The term "rigid" with respect to links 322 and 324 is meant to imply that the links are operable both in tension and compression. The link 324 may be coupled to the trolleys in such a way that, at each end, the link may rotate to accommodate changing geometry, though little, if any, rotation is expected with respect to link 324 between the trolleys. Inasmuch as the shackle 300 may rotate as illustrated by arrow 304, the rigid link 322 couples to the medial trolley 318 in such a way as to enable the rigid link 322 to rotate with respect to an axis defined, for example, by a pin 326. Likewise, the rigid link 322 couples to the shackle in such a way as to enable the rigid link to rotate with respect to an axis defined, for example, by a pin 328.

In accordance with at least some embodiments, the location of the illustrative forward tow point 226 and corresponding aft tow point 230 relative to the upper frame is controlled by a combination of linear movement of the aft trolley 306 and rotational movement of the shackle 306. In particular, the location of the illustrative forward tow point 226 and corresponding aft tow point 230 relative to the upper frame 208 is controlled by linear actuator 312. In the illustrative embodiments of FIG. 3, the linear actuator 312 is shown as a hydraulic cylinder, but other types of linear actuation may be equivalently used (such as an electric or hydraulic motor actuated lead screw assembly). Thus, by selectively controlling the length of the linear actuator 312, the location of the forward tow point 226 and the aft tow point 230 relative to the frame can change, and such change can be implemented during periods of time when the paravane 112 is moving through the water.

Consider, as an example, the linear actuator 312 in a fully extended orientation. In such a situation, the medial trolley 318 is pushed forward. As the medial trolley 318 moves forward, link 324 pulls aft trolley 306, and thus aft tow point 230, forward as well. Moreover, as the medial trolley 318 moves forward, link 322 rotates shackle 300, which rotation results in forward tow point 226 moving forward. Thus, the combination of forces tends to move the location of the forward tow point 226 and corresponding aft tow point 230 forward relative to the upper frame 208, and a distance between the forward tow point 226 and corresponding aft tow point 230 remains substantially unchanged. Given the relative size of paravane 112 for use in marine survey operations (e.g., $L_D$ three meters or more), and for purposes of this specification and the claims, changes in distance between the forward tow point 226 and aft tow point 230 caused by the forward tow point 226 moving away from or toward the upper frame 208 as a result of the rotational of the shackle 300 (i.e., the sine aspect of the movement) are negligible and shall not be considered changes in distance between the tow points.

Now consider the linear actuator in a fully retracted orientation. In such a situation, the aft trolley 306 will be pushed aft by the linear actuator 312 acting through the medial trolley 318 and link 324. Further, the shackle 300 will be pulled aft by the linear actuator 312 acting through the medial trolley 318 and link 322. Thus, the combination of forces tends to move the location of the forward tow point 226 and corresponding aft tow point 230 aft relative to the frame, again without changing the distance between the forward tow point 226 and corresponding aft tow point 230.

In accordance with at least some embodiments, there is a system for selectively changing the location of the forward and corresponding aft tow points associated with each frame. There are slight differences at each frame, the slight differences dictated, at least in part, the relative position of the frame with respect to the bridle tow point 222. For example, with respect to the components in relation to upper frame 208, the bridle tow point 222 (not visible in FIG. 3) is below the frame 208, and thus below the various components to implement the selective control of distance between the forward tow point 226 and corresponding aft tow point 230. Thus, in some embodiments the various components associated with the upper frame couple to a bottom side 330 of the upper frame 208. Returning briefly to FIG. 2, with respect to the middle frame 210, the bridle tow point 222 may be at approximately the same elevation as the middle frame (considered relative to the force developed by the paravane 112), and thus the various components associated with selective control of the location of the forward tow point 234 and corresponding aft tow point 238 may be coupled to the side 250) of the middle frame 210 (where the side 250 abuts both a top and bottom of the middle frame 210). Likewise, with respect to the components in relation to lower frame 212, the bridle tow point 222 is above the frame 212, and thus above the various components to implement the selective control of location of the forward tow point 242 and corresponding aft tow point 246. Thus, in some embodiments the various components associated with the lower frame couple to a top side 252 of the lower frame 212.

Figure 4:
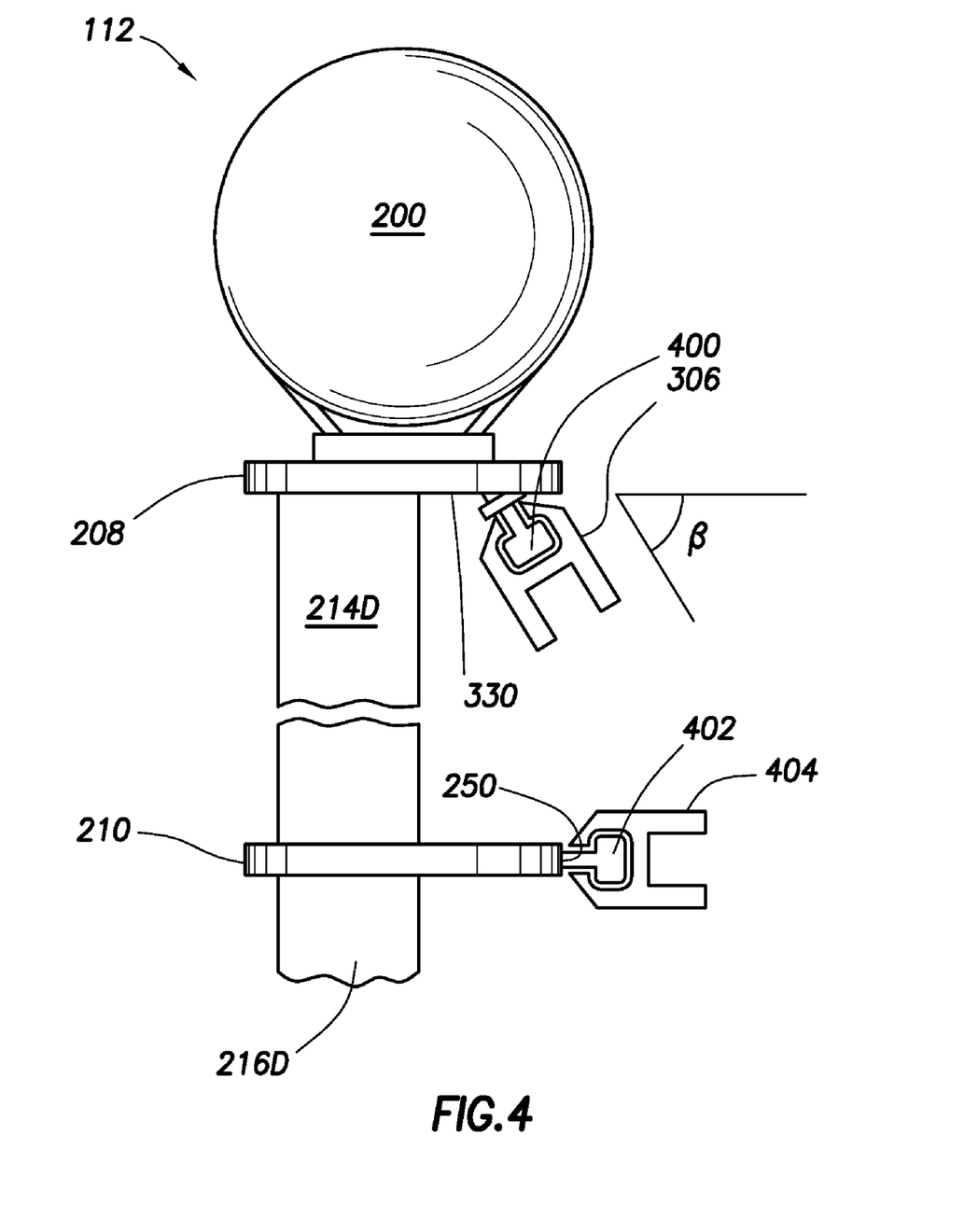
FIG. 4 shows an end elevation view of a paravane in accordance with at least some embodiments.

FIG. 4 shows a partial end elevation view of the paravane 112 in accordance with at least some embodiments. In particular, the view of FIG. 4 is a view from the aft of the paravane looking toward the forward portion of the paravane 112. Visible in FIG. 4 is the float 200, a portion of diverter plate 214D, a portion of diverter plate 216D, upper frame 208, and middle frame 210. The lower frame 212, as well as the towers 202 and 204 of the float 200, have been omitted so as not to unduly complicate the figure. Also visible in FIG. 4 is an illustrative rail 400 associated with the upper frame 208, which in the view of FIG. 4 the rail is effectively shown in cross-section. As illustrated, and because of the relationship between the location of the bridle tow point 222 to the upper frame 208, illustrative rail 400 couples to the bottom 330 of the upper frame 208. The rail 400 is shown to have a substantially rectangular cross-section, but other shapes may be equivalently used (e.g., circular, oval). The rail 400 defines a long axis, which in the view of FIG. 4 is perpendicular to the page. Moreover, the axis of the rail is, in some embodiments, parallel to the long dimension $L_D$ (FIG. 2) of the upper frame 208. Also visible in FIG. 4 is the aft trolley 306, though in the view of FIG. 4 the lines of the bridle are not shown. The illustrative rail 400 and aft trolley 306 are disposed at an angle relative to the bottom side 330 of the upper frame 208, as illustrated by angle β. Angle β is based on the factors such as length of the lines that couple between the tow points associated with the frames and bridle tow points, overall length of the paravane 12, and the like.

Though not shown in FIG. 4 so as not to unduly complicate the figure, lower frame 212 likewise may have a rail similarly aligned with the lower frame 212, but on the top side 252. The rail associated with the lower frame 212 likewise forms an angle with respect to a plane defined by the lower frame 212, and in some cases the angle may be approximately the same as the angle β, but directed upward.

Also visible in FIG. 4 is illustrative rail 402 associated with the middle frame 210, which in the view of FIG. 4 the rail is effectively shown in cross-section. In a particular embodiment, the bridle tow point 222 and the middle frame 210 are at the same elevation (relative to the force exerted on the line 108A), and thus illustrative rail 502 couples to the side 250 of the middle frame 210. The rail is shown to have a cross-section similar to that of rail 400, but the cross-sectional shapes of the rails as between the frames need not be the same. The rail 402 defines a long axis, which in the view of FIG. 4 is perpendicular to the page. Moreover, the axis of rail 402 is, in some embodiments, parallel to the long dimension $L_D$ (FIG. 2) of the middle frame 210. Also visible in FIG. 4 is the aft trolley 404, though in the view of FIG. 4 the lines of the bridle are not shown. In some embodiments, the illustrative rails 400 and 402 extend along the respective frames for a distance long enough to also accommodate the medial trolleys (not visible in FIG. 4). In other cases, distinct rail sections may be provided on each frame—one rail section for the aft trolley, and one rail section for the medial trolley.

Figure 5:
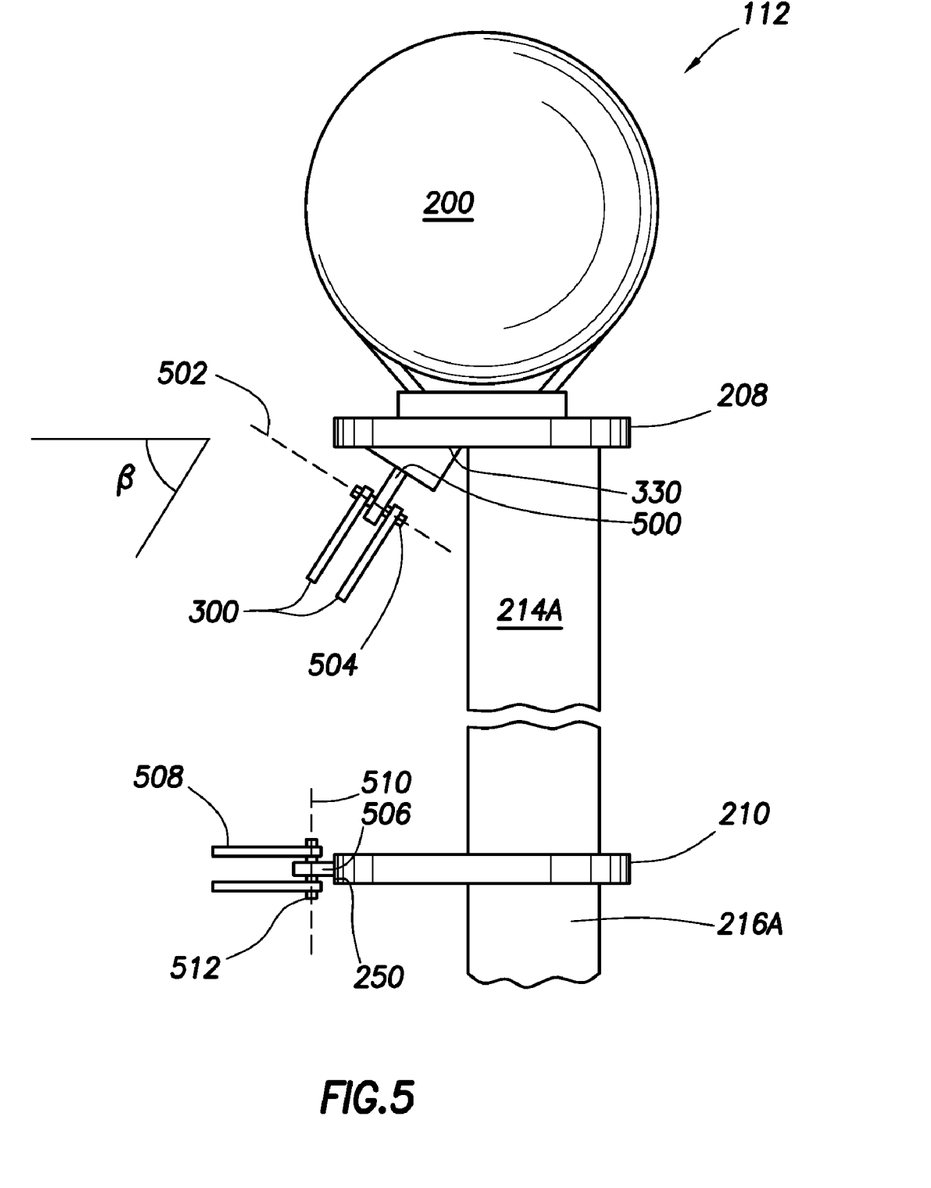
FIG. 5 shows an end elevation view of a paravane in accordance with at least some embodiments.

FIG. 5 shows a partial end elevation view of the paravane 112 in accordance with at least some embodiments. In particular, the view of FIG. 5 is a view from the forward end of the paravane looking toward the aft. Visible in FIG. 5 is the float 200, a portion of diverter plate 214A, a portion of diverter plate 216B, upper frame 208, and middle frame 210. The lower frame 212, as well as the towers 202 and 204 of the float 200, have been omitted so as not to unduly complicate the figure. Also visible in FIG. 4 is the shackle 300 associated with the upper frame 208 (though in the view of FIG. 3 the line 224 of the bridle is not shown). In the view of FIG. 4, the shackle 300 is effectively shown in cross-section. Shackle 300 couples to the upper frame 208 by way of stanchion 500. As illustrated, and because of the relationship between the location of the bridle tow point 222 to the upper frame 208, illustrative stanchion 500 and shackle 300 couple to the bottom 330 of the upper frame 208. The illustrative stanchion 500 and shackle 300 are disposed at an angle relative to the bottom side 330 of the upper frame 208, as illustrated by angle β, which and may be the same as the angle discussed with respect to FIG. 4. The shackle 300, based on length of the linear actuator 312 (not visible in FIG. 5) may rotate about an axis 502 shown by a dashed line, the axis 502 defined by a pin 504 through the stanchion 500.

Though not shown in FIG. 4 so as not to unduly complicate the figure, lower frame 212 likewise has a similar stanchion and shackle coupled to the lower frame 212, but coupled on the top side 252. The stanchion and shackle associated with the lower frame 212 likewise form an angle with respect to a plane defined by the lower frame 212, and in some cases the angle may be approximately the same as the angle β, but directed upward.

Also visible in FIG. 5 is stanchion 506 and shackle 508 associated with the middle frame 210 (though in the view of FIG. 5 the middle-forward line 232 of the bridle is not shown). In the view of FIG. 5 the shackle 508 is effectively shown in cross-section. In a particular embodiment, the bridle tow point 222 and the middle frame 210 are at the same elevation (relative to the force exerted on the line 108A), and thus illustrative stanchion 506 and shackle 508 couple to the side 250 of the middle frame 210. The shackle 500, based on length of the linear actuator 312 (not visible in FIG. 5) may rotate about an axis 510 shown by a dashed line, the axis 510 defined by a pin 512 through the stanchion 506.

The various embodiments for adjusting the location of the forward and corresponding aft tow points relative to each frame enable an array of operational configurations for the paravane 112. In the illustrative case of paravane 112 having three frames and an adjustment mechanism associated with each frame, setting the location of the forward and corresponding aft tow point at each frame may result in changes of angle of attack of the paravane, and thus changes in the magnitude of the lateral force exerted. For example, during turns the paravane with the short radius may be adjusted to have its angle of attack increased to compensate for reduced relative velocity between the paravane the water (e.g., by moving the tow points aft), and the paravane with the larger radius may have its angle of attack decreased to compensate for increased relative velocity between the paravane and the water (e.g., by moving the tow points forward). Similarly, in operational situations where a cross-current exists relative to the intended direction of travel of the tow vessel, the angle of attack as between the paravanes may be adjusted to compensate.

In yet still further embodiments, in addition to control of the magnitude of the force developed, the direction of the force may also be controllable during use by selective control of the bridle geometry. Returning briefly to FIG. 2. For example: the distance between the forward tow point 226 and the corresponding aft tow point 230 (the distance labeled $D_U$ in the figure) of the upper frame 212 may be changed; the distance between the forward tow point 234 and the corresponding aft tow point 238 (the distance labeled $D_M$ in the figure) of the middle frame 210 may be changed; and/or the distance between the forward tow point 242 and the corresponding aft tow point 246 (the distance labeled $D_L$ in the figure) of the lower frame 212 may be changed.

Figure 6:
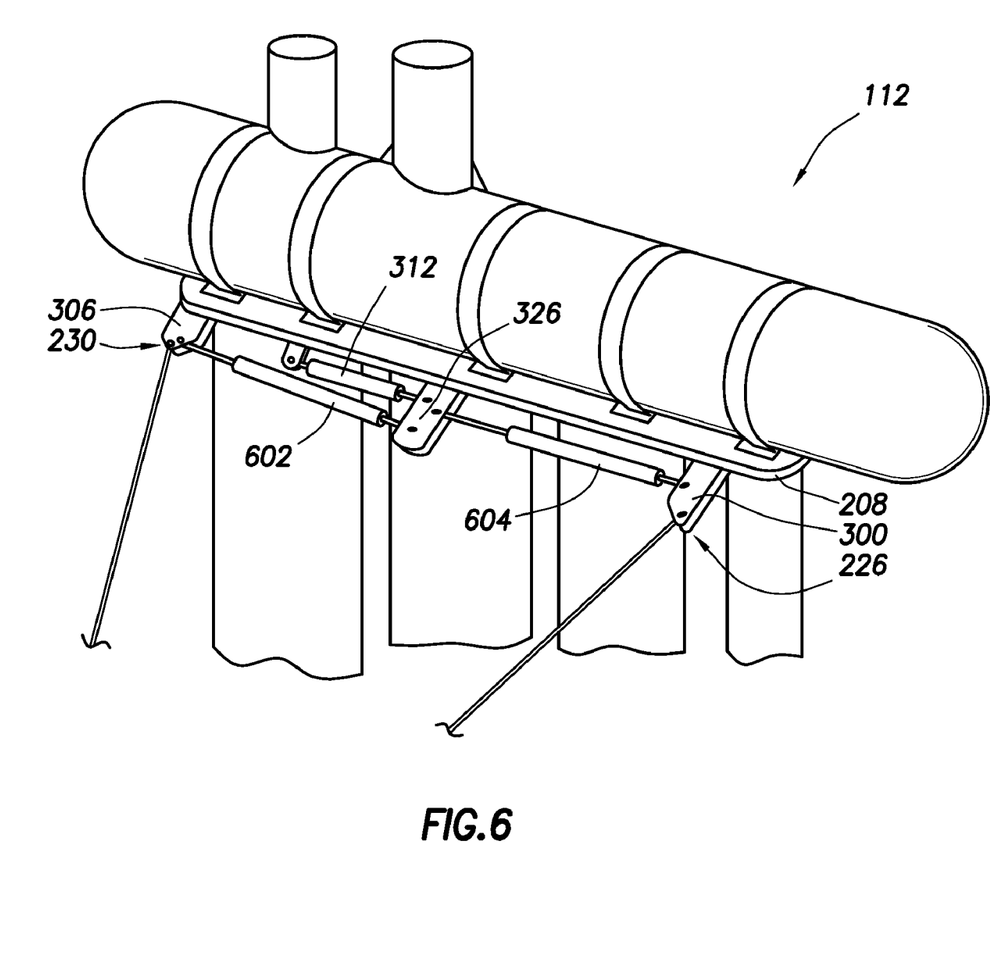
FIG. 6 shows a partial perspective view of a paravane in accordance with at least some embodiments.

FIG. 6 shows a perspective view of paravane 112 in accordance with embodiments where the direction of the force developed is controllable. Here again, the discussion of FIG. 6 is with respect to upper frame 208, but is equally applicable to the middle frame 210, lower frame 212, and any further frames implemented. In particular, FIG. 6 illustrates the aft trolley 306 defining aft tow point 230, linear actuator 312, medial trolley 326, and shackle 300 defining forward tow point 226. All these components function as discussed with respect to FIG. 3. However, in FIG. 6 the link between the aft trolley 306 and medial trolley 326, as well as the link between the medial trolley 326 and the shackle 300 have been replaced by additional linear actuators 602 and 604. The linear actuators 602 and 604 are shown as hydraulic cylinders, but other types of linear actuators may be equivalently used. While possible to replace both links with linear actuators as shown in FIG. 6, the results achieved by replacement of the links can be implemented by use of only one of the linear actuator 602 or 604.

In particular, the embodiments illustrated in FIG. 6 can control not only the location of the forward tow point 226 and corresponding aft tow point 230 relative to the upper frame 208 by way of linear actuator 312, but also the distance between the tow points by selective operation of one or both of the linear actuators 602 and 604. Consider, as an example, the linear actuator 602 in a fully extended orientation. In such a situation, the aft trolley 306 will be pushed away from shackle 300 (i.e., pushed aft) by the linear actuator 602, thus increasing the distance between the forward to point 226 and corresponding aft tow point 230. Now consider the linear actuator 602 in a fully retracted orientation. In such a situation, the aft trolley 306 will be pulled toward shackle 300 (i.e., pulled forward) by the linear actuator 602, thus decreasing the distance between the forward tow point 226 and the corresponding aft tow point 230.

Further consider the linear actuator 604 in a fully extended orientation. In such a situation, the shackle 300 will be pushed away from aft trolley (i.e., pushed forward) by the linear actuator 604, thus increasing the distance between the forward to point 226 and corresponding aft tow point 230. Now consider the linear actuator 604 in a fully retracted orientation. In such a situation, the shackle 300 will be pulled toward aft trolley 306 (i.e., pulled aft) by the linear actuator 604, thus decreasing the distance between the forward tow point 226 and the corresponding aft tow point 230. Each frame may have a similar system to control the distance between the corresponding tow points.

Figure 7:
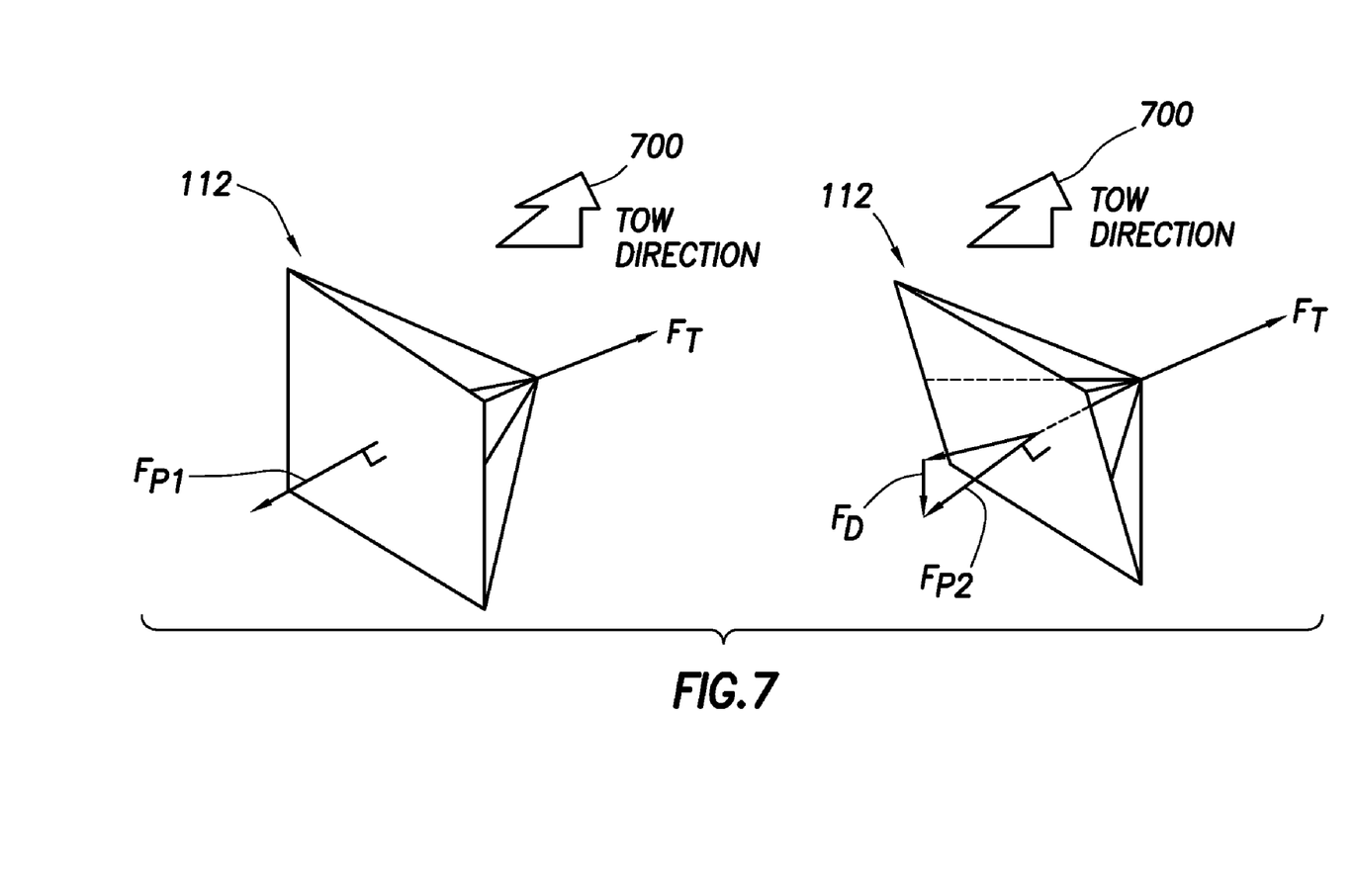
FIG. 7 shows two perspective views of paravanes in accordance with at least some embodiments.

Even in systems where multiple frames exist, and each frame has a system to selectively control the distance between the forward and aft tow points associated with the frame, the systems to selectively control the distances between tow points need not be operated such that changes in distance are identical as between frames. In particular, the systems to selectively control distance may be independently operated to control the direction of the force developed. FIG. 7 shows side-by-side a simplified rear perspective views of paravane 112 as it is towed through water in two illustrative configurations, the direction of travel in each case indicated by arrow 700. In particular, in steady state travel the force supplied by the tow vessel (the force indicated as $F_T$ in FIG. 7) is balanced by the force supplied by the paravane 112 (the force indicated by $F_{P1}$ in the figure). In the example situation on the left, a plane defined by the paravane 112 is illustratively perpendicular to the direction of the force $F_T$. However, by non-identical adjustment of the distance between the tow points at each frame, it is possible to change the angle of the paravane 112 relative to the force $F_T$ (or any other suitable reference, such as with respect to the surface, or the force of gravity) such that the direction of the force developed is different. It is noted that the angle of the paravane 112 as discussed with respect to FIG. 7 is different than the angle of attack of the paravane. That is, the angle of attack of the paravane relative to the direction of travel of the tow vessel (or the direction of water flow past the paravane) may be substantially the same as between the situation on the left side of FIG. 7, and the situation on the right side of FIG. 7; thus, a magnitude of the force created may remain unchanged (i.e., magnitude $F_{P2}$ same as the magnitude $F_{P1}$). However, the direction of the force changes such that, in this example, the vertical component of the force is increased (i.e., the downward component $F_D$ is increased as between the situation on the left and the situation on the right). Thus, depth of the paravane 112 may be controlled by changes in the downward component of the force developed.

It is noted that in changing from the illustrative configuration on the left side of FIG. 7 to that of the right side of FIG. 7, the horizontal component of the force may be reduced, and thus in order to keep the tension on the spreader line 120 (FIG. 1) the same, a corresponding angle of attack adjustment (i.e., changing the position of the tow points relative the frame) may also be in order.

Figure 8:
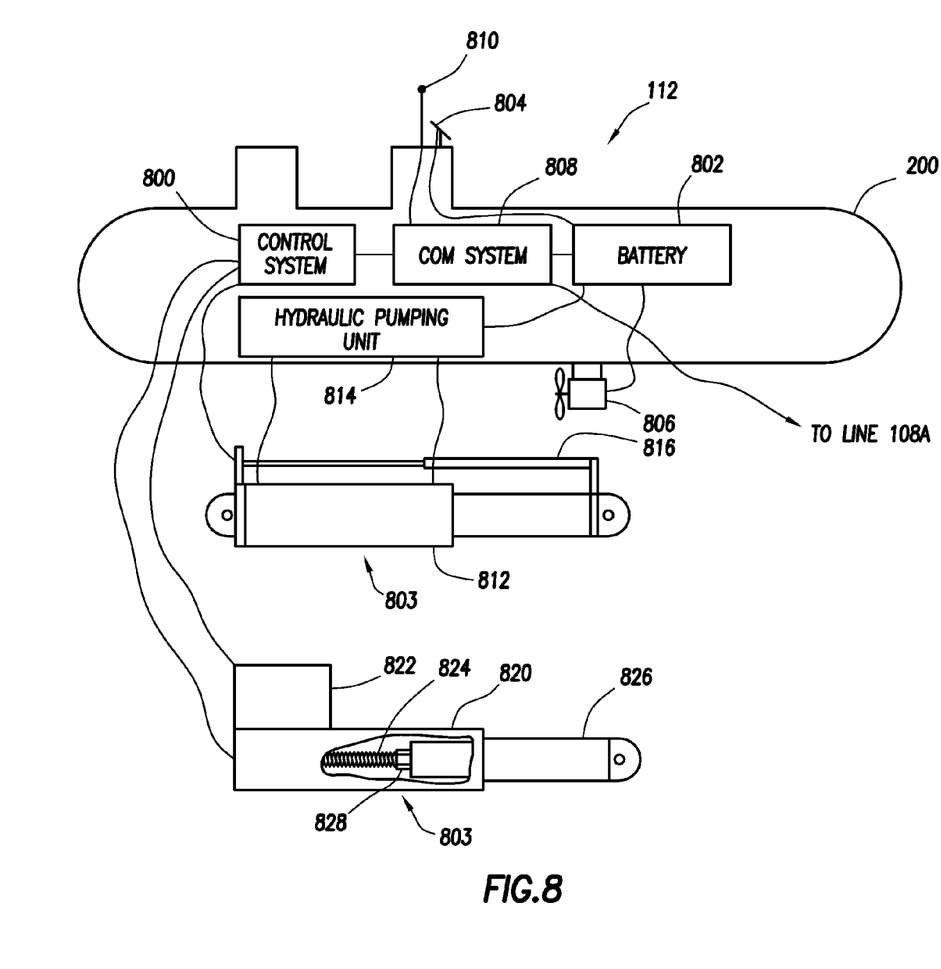
FIG. 8 shows a partial block diagram, partial elevation view of a control system in accordance with at least some embodiments.

In some embodiments, the linear actuators may be operated in a Boolean sense—fully retracted or fully extended. In such situations, there may be no need to know or measure the axial length of the linear actuators. However, in other embodiments, particularly embodiments where non-identical adjustments in axial length of the linear actuators are implemented, axial length of one or more of the linear actuators may be valuable information. In order to control the axial length of the linear actuator(s), at least some embodiments implement a control system operatively coupled to the linear actuator(s). FIG. 8 shows a block diagram of a control system in accordance with at least some embodiments. In particular, FIG. 8 shows float 200, within which various components used for actuation of the linear actuator 312 may reside. For example, in a particular embodiment a control system 800 may reside at least partially within the float 200, and in a particular embodiment within one of the illustrative towers of the float (though not so illustrated in FIG. 8). The control system 800 may be any suitable control system, such as a programmable logic controller (PLC) or dedicated computer system. The control system 800 may derive power from a battery system 802, may derive power from the tow line 108A in the form of a cable as defined herein, or both. In some embodiments, the battery system 802 may be any suitable battery system, such set of lead-acid batteries. The battery system 802 may have sufficient power to perform all desired changes in length of the linear actuator(s) 803 (e.g., 312, 602, 604) during an extended marine survey, or the battery system 802 may be charged during the survey by any suitable system, such as a solar panel 804 and/or electrical generator 806 that extracts energy from the water flowing past the paravane.

In order to know when to operate the linear actuator(s) 803, the control system 800 may couple to a communication system (com system) 808. The communication system 808 may take any suitable form, such as a radio-based system communicating by way of electromagnetic antenna 810, or a system configured to communication over electrical or optical conductors, such as when line 108A coupled to the paravane 112 is a cable as defined herein. Regardless of the precise system implemented by the communication system 808, the control system 800 may receive signals indicative of instructions to change the distance between respective sets of forward and aft tow points (i.e., respective sets being associated with a particular frame), and/or receive instructions to change the location of the tow points).

In the illustrative case of one or more of the linear actuator (s) on a paravane being a hydraulic cylinder 812, the system may comprise a hydraulic pumping unit 814 disposed at least partially within the float 200. In some cases, the hydraulic pumping unit may draw operational power from the battery system, may draw operational power directly from the water flowing past the paravane, or some combination thereof. Regardless, the hydraulic pumping unit 814 may provide hydraulic fluid under high pressure to cause the axial length of the illustrative hydraulic cylinder to change responsive to signals from the survey vessel or some other location.

In cases where precise axial length changes are desired, the system may further comprise a linear sensor associated with the linear actuator 803. For example, FIG. 8 shows a linear sensor 816 mechanically coupled to the hydraulic cylinder 812, and electrically coupled to the control system 800. The illustrative linear sensor 816 may provide feedback to the control system as to the axial length of the hydraulic cylinder 812. The linear sensor may be any suitable linear sensing system, such as a linear potentiometer or linear Hall-effect sensor. It is noted that the term "linear sensor" shall mean that the sensor measures axial distance of a linear actuator, and shall not require the sensors produce signals that, from a mathematical viewpoint, are linearly related to the axial length. For example, even a device that produces an exponentially increasing voltage signal based on axial length of a linear actuator shall still be considered a "linear sensor" for purposes of this specification and claims. Likewise, "linear actuator" refers to a device with a controllable length, and shall not require that length be, from a mathematical viewpoint, linearly related to the control input.

As discussed above, the linear actuator(s) 803 need not be hydraulic cylinders. Other devices with controllable lengths may be equivalently used. For example, FIG. 8 also shows an electrically actuated linear actuator 820. In particular, the linear actuator 820 is shown in partial cut-away to illustrate the internal operation. An electrical motor 822 couples to a lead screw 824. The extension portion 826 threadingly couples to the lead screw 824, such as an internally threaded nut 828. When the electric motor turns the lead screw 824, the extension portion is force out or drawn in, depending on the direction of the rotation of the lead screw 824. In some cases, a linear sensor may be coupled to the exterior of the linear actuator 820 (e.g., a linear sensor such as linear sensor 816), and in other cases the electrically actuated linear actuator 820 may have an internal sensor which senses rotation of the lead screw 824 and thus the axial length.

Figure 9:
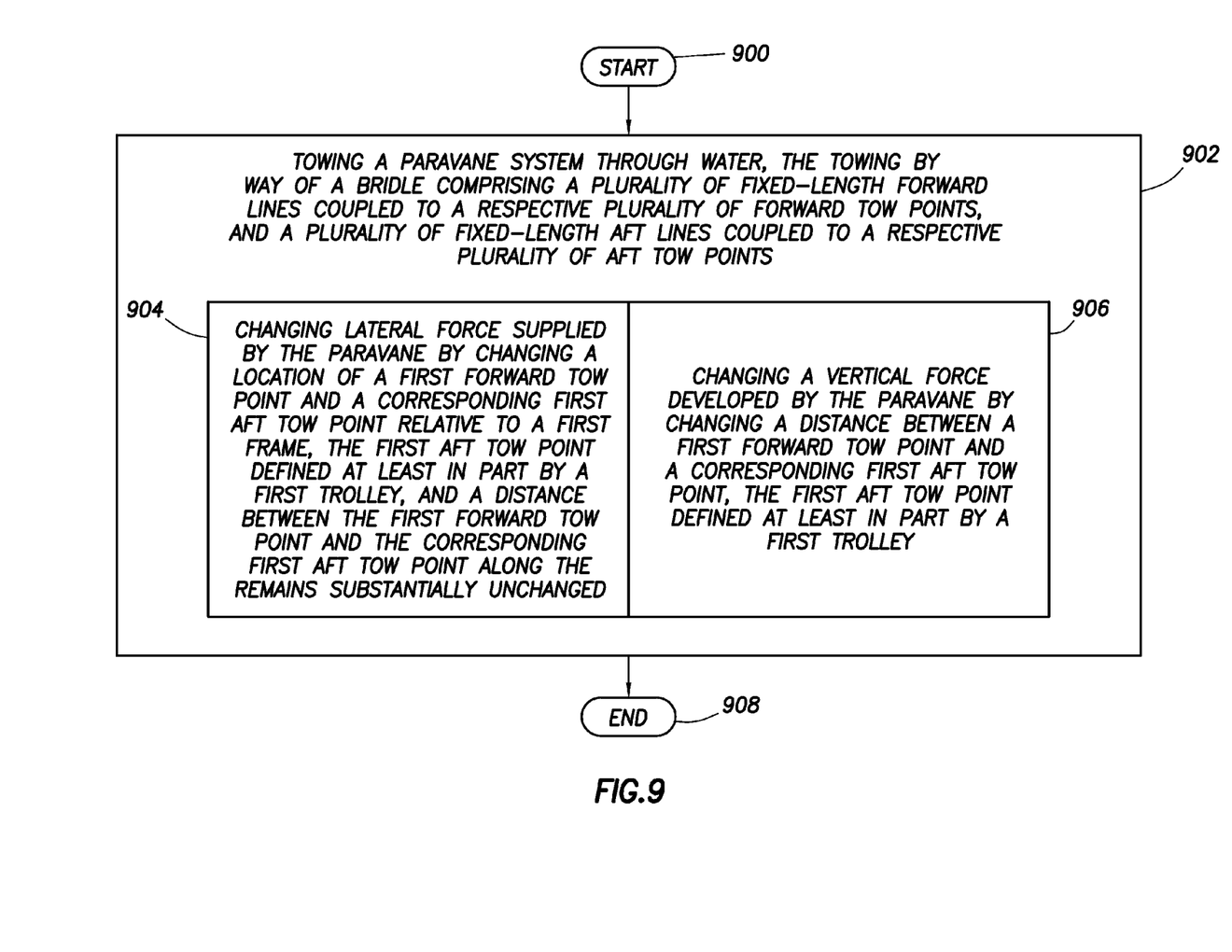
FIG. 9 shows a method in accordance with at least some embodiments.

FIG. 9 shows a method in accordance with at least some embodiments. In particular, the method starts (block 900) and comprises: towing a paravane system through water, the towing by way of a bridle comprising a plurality of fixed-length forward lines coupled to a respective plurality of forward tow points, and a plurality of fixed-length aft lines coupled to a respective plurality of aft tow points (block 902); changing lateral force supplied by the paravane by changing a location of a first forward tow point and a corresponding first aft tow point relative to a first frame, the first aft tow point defined at least in part by a first trolley, and a distance between the first forward tow point and the corresponding first aft tow point along the remains substantially unchanged (block 904). In additional to, or in place of the changing the lateral force, the method may comprise changing vertical force developed by the paravane by changing a distance between a first forward tow point and a corresponding first aft tow point, the first aft tow point defined at least in part by a first trolley (block 906). Thereafter, the method ends (block 908), in some case to be restarted. The looping of the process not shown so as not to unduly complicate the figure.

The above discussion is meant to be illustrative of the principles and various embodiments of the present invention. Numerous variations and modifications will become apparent to those skilled in the art once the above disclosure is fully appreciated. For example, the control system that controls the linear actuator(s) may have an integrated communication system, and thus the separate communication system 808 may be omitted. Also, while the link 324 is shown to reside outside the linear actuator 312, in other cases the link 324 may have a "U" shape, and thus at least partially cover or envelope the linear actuator 312. It is intended that the following claims be interpreted to embrace all such variations and modifications.

What is claimed is:

1. A paravane system comprising:
a float configured to provide a buoyant force to the paravane system when the paravane system is at least partially submerged;
a first frame that has a first long dimension, the first frame comprising:
a first tow point;
a first trolley medially disposed relative to the first frame, the first trolley configured to translate along the first long dimension;
a first link coupled between the first tow point and the first trolley;
a second trolley distally disposed on the relative to the first frame, the second configured to translate along the first long dimension, and second trolley defining a second tow point; and
a second link coupled between the first trolley and the second trolley;
a second frame comprising:
a third tow point; and
a fourth tow point;
a plurality of diverter plates coupled between flue first frame and the second frame; and
a first linear actuator coupled between the first frame and the first trolley, the first linear actuator configured to selectively change location of the first tow point and the second tow point relative to the first frame during periods of time when the paravane system is moving through water.

2. The paravane system of claim 1 wherein the first link further comprises a second linear actuator, the second linear actuator configured to selectively change a distance between the first tow point and second trolley during periods of time when the paravane system is moving through water.

3. The paravane system of claim 1 wherein the second link further comprises a second linear actuator, the second linear actuator configured to selectively change a distance between the first tow point and the second trolley during periods of time when the paravane system is moving through water.

4. The paravane system of claim 1 wherein:
the second frame has a second long dimension, and the second frame further comprises:
a third trolley medially disposed relative to the second frame, the third trolley configured to translate along the second long dimension;
a third link coupled between the third tow point and the third trolley;
a fourth trolley distally disposed relative to the third frame, the fourth trolley configured to translate along the second long dimension, and the fourth aft trolley defining fourth tow point; and
a fourth link coupled between the third trolley and the fourth trolley; and wherein the paravane system further comprises
a second linear actuator coupled between the second frame and the third trolley, the second linear actuator configured to selectively change location of the third tow point and the fourth trolley relative to the second frame during periods of time when the paravane system is moving through water.

5. The paravane system of claim 4 wherein:
the first link further comprises a third linear actuator;
the third link further comprises a fourth linear actuator;
the third linear actuator is configured to selectively change a distance between the first tow point and the second trolley during periods of time when the paravane system is moving through water; and
the fourth linear actuator configured to selectively change a distance between the third tow point and the fourth trolley during periods of time when the paravane system is moving through water.

6. The paravane system of claim 4 wherein:
the second link further comprises third linear actuator;
the fourth link further comprises a fourth linear actuator;
the third linear actuator is configured to selectively change a distance between the first tow point and the second trolley during periods of time when the paravane system is moving through water; and
the fourth linear actuator is configured selectively change a distance between the third tow point and the fourth trolley during periods of time when the paravane system is moving through water.

7. The paravane system of claim 1 wherein:
the first linear actuator is a hydraulic cylinder;
the paravane system further comprises a hydraulic power unit operatively coupled to the hydraulic cylinder;
the hydraulic cylinder is configured to selectively change the location of the first tow point and the second trolley relative to the first frame, the change responsive to changes in axial length of the hydraulic cylinder.

8. The paravane system of claim 7 further comprising:
a linear sensor coupled to the hydraulic cylinder, the linear sensor configured to measure an axial length of the hydraulic cylinder; and
a computer system operatively coupled to the linear sensor and the hydraulic power unit, the computer system configured to control the axial length of the hydraulic cylinder based on signals received from a vessel.

9. The paravane system of claim 8 wherein the computer system is configured to receive the signal from the vessel by at least one channel selected from the group consisting of: wireless signal transmission; transmission along an electrical conductor; and transmission along an optical conductor.

10. The paravane system of claim 1 wherein:
the first linear actuator comprises:
a lead screw coupled to the first aft trolley;
a motor assembly configured to provide rotational motion to the lead screw; and
the paravane system further comprises a computer system operatively coupled to the motor assembly, the computer system configured to control the location of the first tow point and the second trolley relative to the first frame by selectively rotating the lead screw.

11. A method comprising:
towing a paravane system through water, the towing by way of a bridle comprising a plurality of fixed-length forward lines coupled to a respective plurality of forward tow points, and a plurality of fixed-length aft lines coupled to a respective plurality of aft tow points; and
while towing the paravane system through the water
changing lateral force supplied by the paravane by changing a location of a first forward tow point and a corresponding first aft tow point relative to a first frame, at least one of the tow points defined at least in part by a first trolley, and wherein a distance between the first forward tow point and the corresponding first aft tow point remains substantially unchanged;
wherein changing the lateral force further comprises changing a location of a second forward tow point and a corresponding second aft tow point.

12. The method of claim 11 wherein changing the lateral force further comprises actuating a linear actuator which causes the location of the first forward tow point and the corresponding first aft tow point to change relative to the first frame.

13. The method of claim 11 wherein changing the lateral three further comprises actuating a linear actuator which changes the location of the first forward tow point and a first trolley, the first trolley defines the corresponding first aft tow point.

14. The method of claim 11 wherein actuating the linear actuator further comprises changing an axial length of a hydraulic cylinder.

15. The method of claim 11 wherein changing the lateral force further comprises changing the lateral force responsive to a signal transmitted from the tow vessel.

16. The method of claim 11 further comprising changing vertical force developed by the paravane by changing a distance between the first forward tow point and a first trolley, the first trolley defines the corresponding first aft tow point.

17. A method comprising:
   towing a paravane system through water, the towing by way of a bridle comprising a plurality of fixed-length forward lines coupled to a respective plurality of forward tow points, and a plurality of fixed-length aft lines coupled to a respective plurality of all tow points; and
   while towing the paravane system through the water
   changing vertical force developed by the paravane by changing a distance between a first forward tow point and a corresponding first aft tow point, at least one of the tow points defined at least in part by a first trolley;
   wherein changing the vertical force further comprises changing a distance between a second forward tow point and a corresponding second aft tow point, and wherein when the distance between the second forward tow point and the corresponding second aft tow point increases, the distance between the first forward tow point and the corresponding first aft tow point decreases.

18. The method of claim 17 wherein changing the vertical force further comprises actuating a linear actuator which causes the distance between the first forward tow point and the corresponding first aft tow point to change.

19. The method of claim 17 wherein changing the vertical force further comprises actuating a linear actuator which changes the distance between the first forward tow point and a first trolley, the first trolley defining the corresponding first of tow point.

20. The method of claim 17 wherein actuating the linear actuator further comprises changing an axial length of a hydraulic cylinder.

21. The method of claim 17 wherein changing the vertical force further comprises changing the vertical force responsive to a signal transmitted from the tow vessel.

22. The method of claim 17 further comprising changing lateral force developed by the paravane by changing a location of the first forward tow point and as first trolley relative to a first frame, the first trolley defining the corresponding first aft tow point.

* * * * *